United States Patent [19]
Palm et al.

[11] Patent Number: 5,661,518
[45] Date of Patent: Aug. 26, 1997

[54] METHODS AND APPARATUS FOR THE CREATION AND TRANSMISSION OF 3-DIMENSIONAL IMAGES

[75] Inventors: Charles S. Palm; Raymond McLaine, both of Westlake Village, Calif.

[73] Assignee: Synthonics Incorporated, Westlake Village, Calif.

[21] Appl. No.: 481,993

[22] Filed: Jun. 7, 1995

Related U.S. Application Data

[63] Continuation-in-part of Ser. No. 335,381, Nov. 3, 1994.
[51] Int. Cl.⁶ .......................... H04N 13/00; H04N 15/00
[52] U.S. Cl. .......................... 348/42; 348/47
[58] Field of Search ............... 348/42, 43, 47, 348/51, 55; H04N 13/00, 15/00, 13/02, 13/04, 9/47

[56] References Cited

U.S. PATENT DOCUMENTS

| | | |
|---|---|---|
| 3,256,776 | 6/1966 | Land et al. . |
| 3,712,119 | 1/1973 | Cross et al. . |
| 3,712,199 | 1/1973 | Songer, Jr. . |
| 4,134,644 | 1/1979 | Marks et al. . |
| 4,236,172 | 11/1980 | Krasnoperov . |
| 4,247,177 | 1/1981 | Marks et al. . |
| 4,480,263 | 10/1984 | van Merode . |
| 4,620,770 | 11/1986 | Wexler . |
| 4,743,965 | 5/1988 | Yamada et al. ........... 358/88 |
| 4,751,570 | 6/1988 | Robinson ................. 358/88 |
| 5,140,415 | 8/1992 | Choquet .................. 358/88 |
| 5,175,616 | 12/1992 | Milgram et al. ........... 358/88 |
| 5,193,000 | 3/1993 | Lipton et al. ............. 358/92 |
| 5,218,386 | 6/1993 | Levien . |
| 5,235,416 | 8/1993 | Stanhope ................ 358/101 |
| 5,260,773 | 11/1993 | Dischert .................. 358/3 |
| 5,264,964 | 11/1993 | Faris . |
| 5,341,168 | 8/1994 | Hernandez ............... 348/42 |
| 5,495,576 | 2/1996 | Ritchey .................. 395/125 |
| 5,515,301 | 5/1996 | Corby, Jr. et al. .......... 364/578 |

*Primary Examiner*—Thai Q. Tran
*Assistant Examiner*—Vincent F. Boccio
*Attorney, Agent, or Firm*—Lowe, Price, LeBlanc & Becker

[57] ABSTRACT

Three-dimensional color images are produced by combining the red image plane from a left color camera and the blue and green image planes from a right color camera. Techniques for compensating for over or underexposure in a particular image plane are deployed as well as techniques for minimizing subjective disturbance when viewing relatively pure color regions of a 3-dimensional image and for transmission of 3-dimensional color television images to users. TDM and MPEG 2 transmission techniques for stereo image transmission are disclosed. Left and right images are caused to be epipolar to reduce adverse user reaction to extended viewing of stereo images. A three dimensional perspective view may be connected to a stereo view in accordance with the invention.

1 Claim, 16 Drawing Sheets

$$\alpha_R = ARCSIN \frac{y_{B_R}}{\overline{AB}}$$

$$\alpha_L = ARCSIN \frac{y_{B_L}}{\overline{AB}}$$

$$\Delta\alpha = \alpha_R - \alpha_L$$

METHODS AND APPARATUS FOR THE CREATION AND TRANSMISSION OF 3-DIMENSIONAL IMAGES

CROSS REFERENCE TO RELATED APPLICATIONS

This application is a continuation in part of application Ser. No. 08/335,381 by the same inventors, filed Nov. 3, 1994, titled METHOD AND APPARATUS FOR THE CREATION AND TRANSMISSION OF 3-DIMENSIONAL IMAGES (Docket No. 2345-002), the contents of which are hereby incorporated by reference.

This application is also related to application Ser. No. 08/318,047, filed Oct. 10, 1994, titled METHOD AND APPARATUS FOR INTERACTIVE IMAGE CORRELATION FOR THREE DIMENSIONAL IMAGE PRODUCTION (Docket No. 2345-001) the contents of which are hereby incorporated by reference.

This application is also related to application Ser. No. 08/327,471, filed Oct. 21, 1994, titled METHODS AND APPARATUS FOR RAPIDLY RENDERING PHOTO-REALISTIC SURFACE ON 3-DIMENSIONAL WIRE FRAMES AUTOMATICALLY (Docket No. 2345-003) the contents of which are hereby incorporated by reference.

TECHNICAL FIELD

This invention relates generally to the field of image processing and more particularly to the creation, enhancement transmission, and presentation of 3-dimensional (3-D) images on a 2-dimensional viewing surface.

BACKGROUND OF THE INVENTION

Since the invention of the stereoscope in 1847, there has been a desire for emulating the 3-D images of nature instead of being content with two dimensional images which lack realism due to the absence of depth cues. Many techniques have been devised and developed for producing 3-D images, each varying in degree of success and quality of image. These techniques generally belong to two major classes, namely the autostereoscopic imaging class which produces 3-D images which can be viewed freely without spectacles, and the binocular stereoscopic imaging class which produces 3-D images which requires observers to wear spectacles or viewers. Techniques of the later class have been found in 3-D movies of the 1950's and in occasional 3-D image productions such as 3-D comic books.

Color separation of stereo images has been utilized for over fifty years in the production of photographs, 3-D movies and the printed page. In prior art devices such as shown in U.S. Pat. No. 3,712,119, stereo images are separated by mutually extinguishing filters such as a blue-green lens filter over one eye and a red filter over the other eye. With this combination, a full true color image is not obtained, and this color combination may cause eye fatigue, and color suppression.

In the prior art an object of a single pure color matching the filter color e.g. red or blue-green, would be transmitted only to one eye and so would not appear in stereo. However, pure colors are rare, and most objects are off-white, or pastel shades and so contain all three primary colors. Thus, most objects will have some component of each color and this enables the separation of right and left stereo images.

Prints, drawings or representation that yield a 3-D image when viewed through appropriately colored lenses are called anaglyphs.

An anaglyph is a picture generally consisting of two distinctly colored, and preferably, complementary colored, prints or drawings. The complementary colors conventionally chosen for commercial printings of comic books and the like are orange and blue-green. Each of the complementary colored prints contains all elements of the picture. For example, if the picture consists of a car on a highway, then the anaglyph will be imprinted with an orange car and highway, and with a blue-green car and highway. For reasons explained below, some or all of the orange colored elements of the picture are horizontally shifted in varying amounts in the printing process relative to their corresponding blue-green elements.

An anaglyph is viewed through glasses or viewers having lenses tinted about the same colors used to prepare the anaglyph (hereinafter, "3-D glasses"). While orange and blue-green lenses are optimally used with an orange and blue-green anaglyph, red and blue lenses work satisfactorily in practice and apparently are conventionally used.

The orange elements in the picture are only seen through the blue lens, the red lens "washing out" the orange elements. For the same reason, the green-blue elements are only seen through the red lens. Hence, each eye sees only one of the two colored pictures. But because the different colored elements are horizontally shifted in varying amounts, the viewer's eyes must turn inward to properly view some elements, and turn outward to properly view others. Those elements for which the eyes turn inward, which is what the viewer does to observe a close object, are naturally perceived as close to the viewer. Elements for which the viewer's eyes turn outward are correspondingly perceived as distant. Specifically, if the blue lens covers the viewer's right eye, as is generally conventional, then any blue-green element shifted to the left of its corresponding orange element appears to the viewer as close. The element appears closer the greater the leftward shift. Conversely, as a green-blue element is shifted only slightly leftward, not at all, or even to the right of its corresponding red element, that element will appear increasingly more distant from the viewer.

In addition to horizontally shifting the element pairs relative to each other, some users of anaglyphy for comic books also vertically shift the element pairs a slight amount relative to each other. Those users believe that the slight vertical shift improves the 3-D effect.

Normally 3-D images appear monochromatic when viewed through 3-D glasses.

Three dimensional techniques are closely related to the psychology and physiology of an observer's cognitive processes. Subtle changes in selection of portions of the spectrum presented to each eye can result in significant changes in the observer's perception. Even when viewing the same 3-dimensional image through the same viewers, different observers may perceive a 3-dimensional image in different ways.

Many viewers have difficulty when viewing 3-dimensional images and cannot view the images for any significant length of time without unpleasant side effects, such as headaches.

The transmission of programming, in particular, video programming where wide bandwidth is required, has been known to include a variety of compression techniques. Modern decoders of compressed video information will adapt their operating modes in dependence upon the properties of the incoming signal. It is also often the case that video programming is distributed in multiplexed format which requires that either the decoder or an associated demultiplexer be aware of where in the multiplexed stream particular programs are located.

One of the widely accepted standards for the distribution of video programming is that promulgated by the Organisation Internationale de Normalisation (International Organization for Standardization) under Standard ISO/IEC JTC1/SC29/WG11 entitled "Coding of Moving Pictures and Associated Audio". The particular working group responsible for that standardization effort is also known as the Motion Picture Experts Group.

MPEG compression and decompression standards have been evolving. The current advanced version is generally known as MPEG-2. The MPEG-2 standard is hereby incorporated by reference in its entirety. In the language of the MPEG-2 standard, a "program" is comprised of typically a source of video and a source of audio which share a common time base. One or more elementary digital streams (e.g. video or audio), as well as other data, are combined into single or multiple streams which are suitable for storage or transmission. System coding follows the syntactical and semantic rules imposed by the MPEG-2 specification and provides information to enable synchronized decoding without either overflow or underflow of decoder buffers over a wide range of retrieval or receipt conditions.

Under the MPEG-2 standard, an incoming individual video signal and related audio signal are encoded and packetized into a respective Video Packetized Elementary Stream (PES) and Audio Packetized Elementary Stream. The video and audio PES from one or more programs are combined into a transport stream for transmission or storage.

The transport stream is designed for use in environments where errors are likely, such as storage or transmission in lossy or noisy media. Transport stream packets are 188 bytes in length. Transport stream packets are generally divided into two sections. The first section constitutes header information and the second constitutes payload. Header information includes, inter alia, a synchronization byte, transport scrambling control and a thirteen bit program identification (PID) indication. PID value 0 is reserved as an indication that the packet includes program association table data. PID value 1 is reserved for conditional access such as encryption. PID value 0×1FFF is reserved for administrative (no-op) packets utilized for synchronizing the link. Other program identification numbers are utilized to identify transport packets with the program source from which they originate.

FIG. 1 depicts a transport stream utilizing the MPEG-2 standard. As indicated above, each transport packet in the transport stream carries a program identification number (PID). PID 0 carries program association table information. As illustrated in FIG. 1, a program association table maps a particular program source with the location of the PID associated with a program map related to that source. Thus, the program association table defines the location of program maps for each source of programming in the transport stream. The program map for CBS is found in PID 132; the program map for NBC is found in PID 87 and so forth.

The program map for CBS illustrated in FIG. 1 as that associated with PID 132 identifies the PID numbers for the packetized elementary streams (PES) for the video and audio channels associated with the program. One should note at this time that more than two PID's may be associated with a program. For example, there could be a data channel associated with the program which would include data for closed captioning for the hearing impaired. There could be a number of audio elementary streams for, for example, respective different languages. Thus the programming map provides some flexibility beyond that required for merely associating a single video and audio elementary streams.

Once the program map is known, the program decoder can be set to extract the desired elementary streams (e.g PID 56 in FIG. 1 and PID 74 shown in FIG. 1) for decoding and presentation. Transport packets of PID=56 represents the video elementary stream associated with CBS' MPEG video system. Within CBS' video elementary stream are video sequence headers which define things like frame rate, resolution, and the coordinates on the screen where display of the image should begin. Such coordinates are useful, for example, in defining pictures within a picture when multiple pictures are superimposed. After the video header sequence, the normal video syntax occurs which, in the case of MPEG, includes the normal frames associated with video compression such as I frames and B frames used in MPEG.

The elementary stream with PID=74 is the audio stream associated with the video shown in transport packets with PID=56 as defined in program map at PID=132.

A typical MPEG-2 transport demultiplexer and decoder is shown in FIG. 2. The data link specific interface 210 converts the incoming data link format (e.g. optical fiber encoded data) to a form (e.g. electrical) for demultiplexing and decoding. Transport stream demultiplexer 220 monitors the PID's of the incoming transport stream packets to identify those selected for decoding and routes those to respective video (230) and audio (240) decoders. Since the video and audio associated with the same program are derived from a common clock, clock control 250 drives both decoders. Note that the transport stream demultiplexer includes functionality, such as that described in connection with the description of the transport stream of FIG. 1, necessary to identify the particular PID's needed to extract information from the transport stream to present the desired program to the user.

Referring again to FIG. 1, when a subscriber tunes, for example, to CBS for the first time, before decoding can take place, a program association table and the program map for the selected channel must be received in the stated order from the transport stream. Thereafter, a packet from the video elementary stream must arrive with header information about the frame rate, resolution and coordinates for display of the image and the like before the decoder can be set up to actually decode the payload data associated with the video elementary stream.

Returning to the three dimensional imaging, one problem common to most observers arises when viewing a pure red or pure blue region of a 3-dimensional image through red/blue 3-dimensional glasses. In such circumstances, one eye will perceive black and the other eye will perceive nothing. This has a psychological and/or physiological impact on the viewer which most viewers find disturbing.

Further, when observing 3-dimensional images in which the left and right images are captured using complementary filters, the images reproduced in the colors of the filters, and viewed through viewers of the same colors (e.g. red/blue glasses) which separate the images, 3-dimensional images appear only in black and white. That is, color information is lost in the preparation of the 3-dimensional image. This is characteristic of most 3-dimensional images.

When processing color images using computers, it is common to separate an image into (e.g.) red, green and blue image components. Commonly each color component is referred to as an image plane. In the display of color images on a color cathode ray tube it is common to apply information from each color image plane to a respective electron gun of the cathode ray tube.

Normally, in the past, when preparing 3-dimensional motion pictures, the anaglyph frames were prepared in the post production suite.

When color images are captured, it sometimes occurs that one of the colors utilized for representing the image may be overexposed or underexposed as reflected, inter alia, in an inadequate dynamic range for that color. That is, anytime the color appears at all, it appears at maximum value or anytime it appears it appears at some minimum value instead of being spread over the entire dynamic range of representation. This adversely affects the quality of 3-D image produced.

In certain instances, for example in some video games, perspective views are generated from 3-dimensional wireframes. It would be desirable to be able to selectively implement either 3-dimensional perspective views of 3-dimensional stereo views.

The prior art generally required complex specialized equipment for the transmission of 3-dimensional images. This inhibited the use of 3-D technology because much capital investment has been devoted to equipment for handling regular 2-dimensional images. It would be desirable to utilize 2-dimensional transmission equipment to produce 3-dimensional images. It would also be desirable to have simple transmission equipment and reception equipment which would be suitable for distributing 3-dimensional images.

DISCLOSURE OF THE INVENTION

Accordingly, one advantage of the invention is the creation of 3-dimensional images which are perceived in color.

Another advantage of the invention is the elimination of the subjective disturbance perceived when either pure red or pure blue portions of an image are viewed.

Another advantage of the invention relates to correcting overexposure or underexposure of a particular color utilized in creation of 3-dimensional images.

Another advantage of the invention is the creation of 3-dimensional moving images on line rather than in the post production suite.

Another advantage of the invention is the transmission of 3-dimensional color television images over existing broadcast and communication facilities in a cost effective manner.

Another advantage of the invention lies in improving the viewability of three dimensional stereo images by causing corresponding points in the left and right images to have the same vertical displacement from the top of the viewing plane. This avoids the necessity of having to displace the left and right eye vertically when viewing the point on the image.

Another advantage of the invention lies in the ability to transform left and right images of a scene so as to be epipolar to thereby reduce viewer discomfort when viewing three dimensional images.

Another advantage of the invention resides in improved techniques for transmitting three dimensional images from a source to a user using multiplexing.

The invention yields yet another advantage over the prior art in the ability to transform information about a perspective view of an object which has a representation as a three dimensional wireframe and generating from that information three dimensional stereo views of that object.

Another advantage of the invention comes from adjusting camera separation or image disparity as a function of the distance to the target object. This permits the target object to be placed either in the neutral plane or at a point where good stereo depth perception can be obtained regardless of distance from or nearness to the cameras.

According to the invention, the foregoing and other objects and advantages are obtained by providing a device for making 3 dimensional color images which uses a left and a right color video camera, each of which produces synchronized outputs comprising 3 image planes with each plane corresponding to red, green and blue color information respectively. The red image plane from the left color video camera is combined with the green and blue image planes from the right color video camera to produce a three dimensional output signal. A frame grabber can be used for each color video camera to capture related frames of each color video camera to produce a still three dimensional digital anaglyph of the images captured by the frame grabber.

Another aspect of the invention involves a method for making three dimensional color images of a scene using a left and a right color video cameras and producing an output video signal from each camera having red, green and blue image planes and by providing green and blue image planes from the right color video camera and a red image plane from the left color video camera as the output signal.

Another aspect of the invention relates to apparatus for making three dimensional images using a left and a right video camera each producing an output comprising 3 image planes, each plane corresponding to particular color information. One image plane from one of the left or right video cameras, preferably the red image plane, is replaced with an image plane from the other of the left or right video cameras and the information from two cameras is combined into one or more three dimensional video images.

Another aspect of the invention relates to a method of creating a three dimensional image from two images captured from two different positions by resolving each of the two images into three separate color components and combining one color component from one of the two images with two color components from the other of the two images to create a combined image.

Still another aspect of the invention relates to a method of creating a three dimensional image from two digital images captured from two different positions by resolving each of the two images into separate color planes, and combining one color plane from one of the two images with at least one color planes from the other of the two images to create a combined three dimensional image.

A different aspect of the invention relates to a method and apparatus for making three dimensional images in which a left and a right color video camera each produce an output comprising red, green and blue image planes. Green and blue image planes from the right color video camera and the red image plane from the left color video camera are combined into an output signal. The color value of each pixel of the output signal is monitored and, when the value lacks a first threshold amount of blue or green color or lacks a second threshold amount of red or green color, a quantity of blue and/or green color or a quantity of red and/or green color, respectively, is added to the pixel color value. As a result, information from two color video cameras is combined into three dimensional color video images which are perceived more acceptably when observed through red/blue viewers.

Another aspect of the invention involves method and apparatus for making three dimensional images by using a left and a right color video camera to produce an output comprising red, green and blue image planes respectively. Green and blue image planes from the right color video camera and a red image plane from the left color video camera are combined as an output signal. The color values of each pixel of the output signal is monitored and, when the red value of a number of pixels indicates underexposure or overexposure in red, substituting a brightened value from the green image plane of the left color video camera. As a result, information from two color video cameras is combined into three dimensional color video images which are perceived more acceptably when viewed through red/blue viewers.

The invention also relates to a method and apparatus for broadcasting three dimensional television images by capturing images using a left and a right color television cameras. Each camera produces an output comprising red, green and blue image planes. A signal containing the output from the left color video camera is transmitted using a first television transmitter and a signal containing the output from the right color video camera is transmitted using a second television transmitter. At a receiver, signals from the first and second television transmitters are received and respective outputs comprising the three image planes from the left and right color video cameras, produced. Green and blue image planes from the right color video camera and a red image plane from the left color video camera are combined into an output signal for viewing on a display.

Another aspect of the invention relates to a method and apparatus for broadcasting three dimensional television images by producing a color video output comprising red, green and blue image planes from left and a right color video cameras; broadcasting signals containing the output from the right color video camera using a television transmitter; transmitting signals containing the red image plane from the left color video camera over a point to point communications link; and receiving at a receiver the signals from the television transmitter and said signals from the point to point communications link for providing green and blue image planes from the right color video camera and a red image plane from the left color video camera as an output signal to a display for viewing. Thus, information from two color video cameras is combined into three dimensional color video images at a receiver.

Another aspect of the invention includes the computer generation of 3-dimensional anaglyphs. An object is represented in a 3-dimensional representation such as a wire frame generated using a 3-dimensional database. A full color surface can be rendered (applied) on the wire frame. Two different 2-dimensional views of the object are generated from different perspectives, corresponding, in one example, to views from the left and right eyes. The red image plane from the left perspective is combined with the blue-green image planes from the right perspective to create a 3-dimensional anaglyph representation of the object.

One aspect of the invention has as its basis the discovery that difficulty in viewing three dimensional stereo images can be reduced or overcome by causing corresponding points in the left and right images to be epipolar, that is, the corresponding points have the same vertical displacement vis-a-vis a reference line, such as the top of the viewing plane.

The invention is therefor directed to improving the viewability of three dimensional stereo images by causing corresponding points of left and right images to have the same vertical displacement in the viewing plane or by causing corresponding points on the left and right images to lie on the same scan line.

The invention is also directed to improving the viewability of three dimensional stereo images of a scene consisting of a left image and a right image which when viewed together give a perception of a stereo view of the scene, by identifying a point lying in a neutral plane as a reference point, selecting a point not located in the neutral plane, and rotating one of the left image or right image by an amount required to cause the locations of the left and right images of said point not located in the neutral plane to have substantially identical vertical displacements in the viewing plane.

In another aspect, the invention is directed to apparatus for transmitting three dimensional stereo color images including a left video camera and a right video camera each producing an output comprising 3 image color planes, each plane corresponding to particular color information, and a multiplexer for multiplexing color plane information from said left video camera and said right video camera into a composite signal for transmission. The multiplexer may be either a time division multiplexer or an MPEG encoder.

In another aspect, the invention the invention is directed to generating three dimensional stereo views of an object from a perspective view of an object represented as a three dimensional wireframe, by receiving information specifying identity of the object, object location and camera location from which said perspective view was generated, generating a second view of said object from a second camera position, offset from the camera location from which the perspective view was generated, rendering said second view of said object, and using said perspective view and a rendered version of said second view to produce a three dimensional stereo view of said object.

In a slightly different approach, the invention is directed to generating three dimensional stereo views of an object from a perspective view of an object generated from a three dimensional wireframe, by receiving information specifying identity of the object, object location and perspective camera location from which the perspective view was generated, generating a first and a second view of the object from first and second stereo camera positions equally offset from the perspective camera location from which the perspective view was generated, rendering said first and second views of said object to produce rendered views, and using the rendered views to produce a three dimensional stereo view of said object. Preferably, the first and second stereo camera positions are fixed relative to each other and the viewing orientations from which said first and second views at said stereo camera positions are generated are fixed relative to each other.

According to the invention, the target object of the image view is presumed to be the most important object and is place by default in the neutral plane (the plane where there is zero disparity between points on the left and right images. However, the default may be optionally overridden by adjusting the amount of disparity between the left and right images.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects all without departing from the invention. Accordingly, the drawings and description are to be regarded as illustrative in nature and not as restrictive.

BEST MODE FOR CARRYING OUT THE INVENTION

Figure 3:
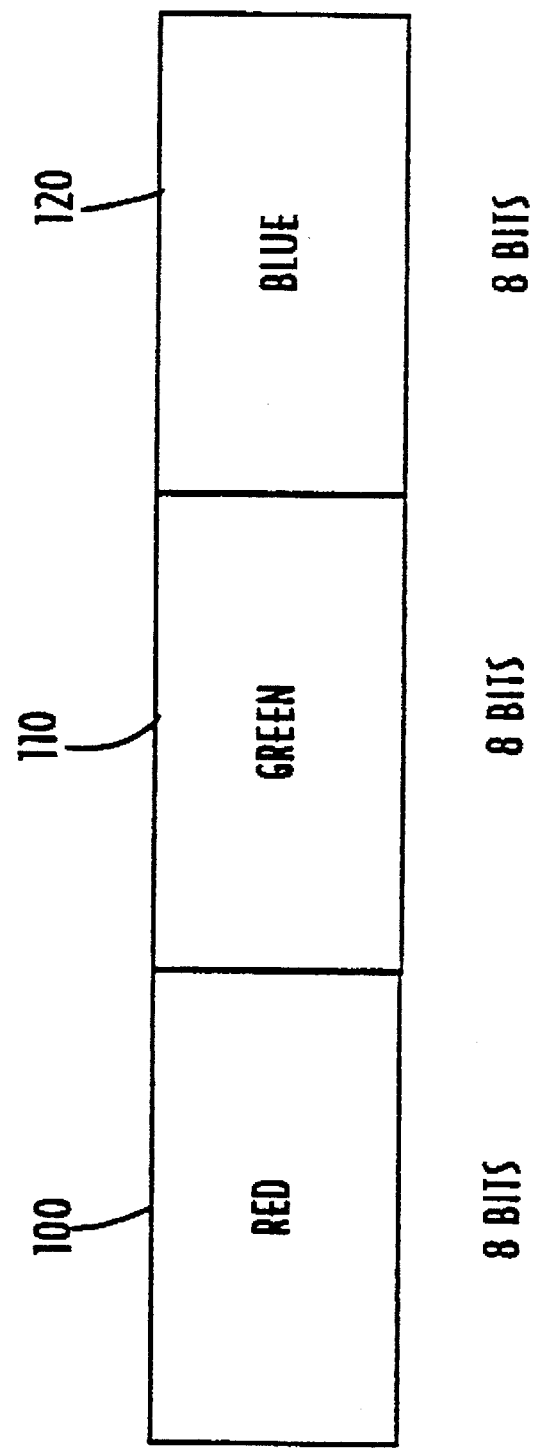
FIG. 3 is an illustration of a common way of storing color pixel information for digital processing in the prior art.

The invention is based in part upon a recognition that color 3-dimensional images can be produced by shifting color plane information. FIG. 3 illustrates how digital color image information for a single pixel may be stored when undertaking digital image processing. Twenty-four bits of information are illustrated in FIG. 3, however, the number of bits per pixel and the number of bits per field may be selected to meet the needs of a particular design. In the example illustrated in FIG. 3, 8 bits illustrated at 100 represent red information whereas the two sets of 8 bits each at 110 and 120 represents color intensity levels for respective green and blue color components for a particular pixel. With 8 bits each, each indication of color intensity level may represent 256 different intensity levels. The 8 levels in each of 3 colors permits $2^{24}$ color intensity combinations to be represented.

Figure 1:
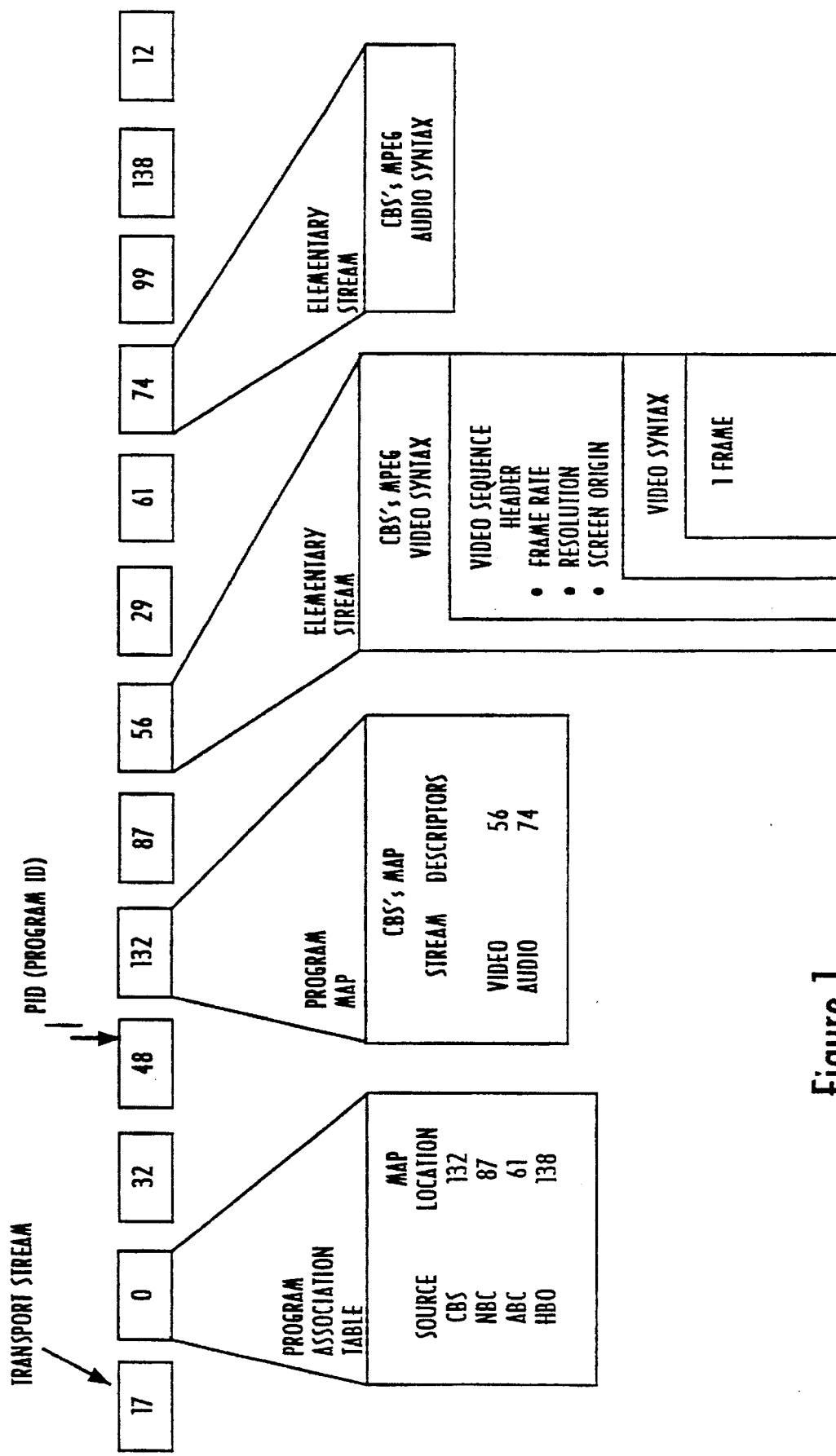
FIG. 1 depicts the use of an MPEG-2 transport stream in delivering video programming.

In a typical cathode ray tube (CRT) shadow mask display, separate electron guns are utilized to activate separate red, green and blue phosphor dots on the screen selectively. The red, green and blue bits of the color information depicted in FIG. 1 are utilized to establish the intensity of red, green and blue components or in other words the color for the pixel. If a pure blue pixel were desired, the red and green electron guns would be turned off and only the blue gun would bombard the blue phosphor dot of the triad at an intensity level set by the 8 bit intensity level value for blue (120). If a pure red pixel were desired, the green and blue guns would be turned off by virtue of the 0 values represented in fields 110 and 120 of FIG. 3, and the red gun would be activated at the intensity level set by the 8 bit field 100. For mixed colors, the intensity levels from the three fields 100, 110 and 120 control the color and intensity of the light output from a phosphor dot triad in the CRT screen.

Digital image arrays can be very large. For example, digitizing a fairly standard black and white photographic image can involve a storage requirement of 8 megabits for an array of 1024×1024 elements. This assumes 256 intensity levels. One byte (8 bits) of data is utilized to represent the intensity level of each pixel.

In the example shown in FIG. 3, 8 bits are utilized to represent each color intensity level. Thus a color image of 1024×1024 elements utilizing the storage scheme of FIG. 3, would require 24 megabits of storage. In many applications, even finer resolution is required with the attendant increasing storage overhead.

In the storage of a 1024×1024 color image utilizing the scheme shown in FIG. 3, 8 megabits of information constitutes red only information, a separate 8 megabits of information constitutes green only information and a final 8 megabits of information constitutes blue only information. The aggregation of storage dedicated to particular color information is called a color plane.

The system described above is referred to typically as RGB (red, green, blue) color storage.

Psychologists usually describe color by "hue" the color name which depends on average wave length, by "saturation", the purity of the color, and by "intensity", the overall brightness of the color. Standard formulas are well known in the art for converting between RGB representation and HSL representation.

YIQ coding used in commercial television transmission utilizes a different transformation representation than the HSL system. It requires a luminance component (Y) for monochrome sets and two chromanance components (IQ) which take weighted differences of the RGB values.

Figure 4:
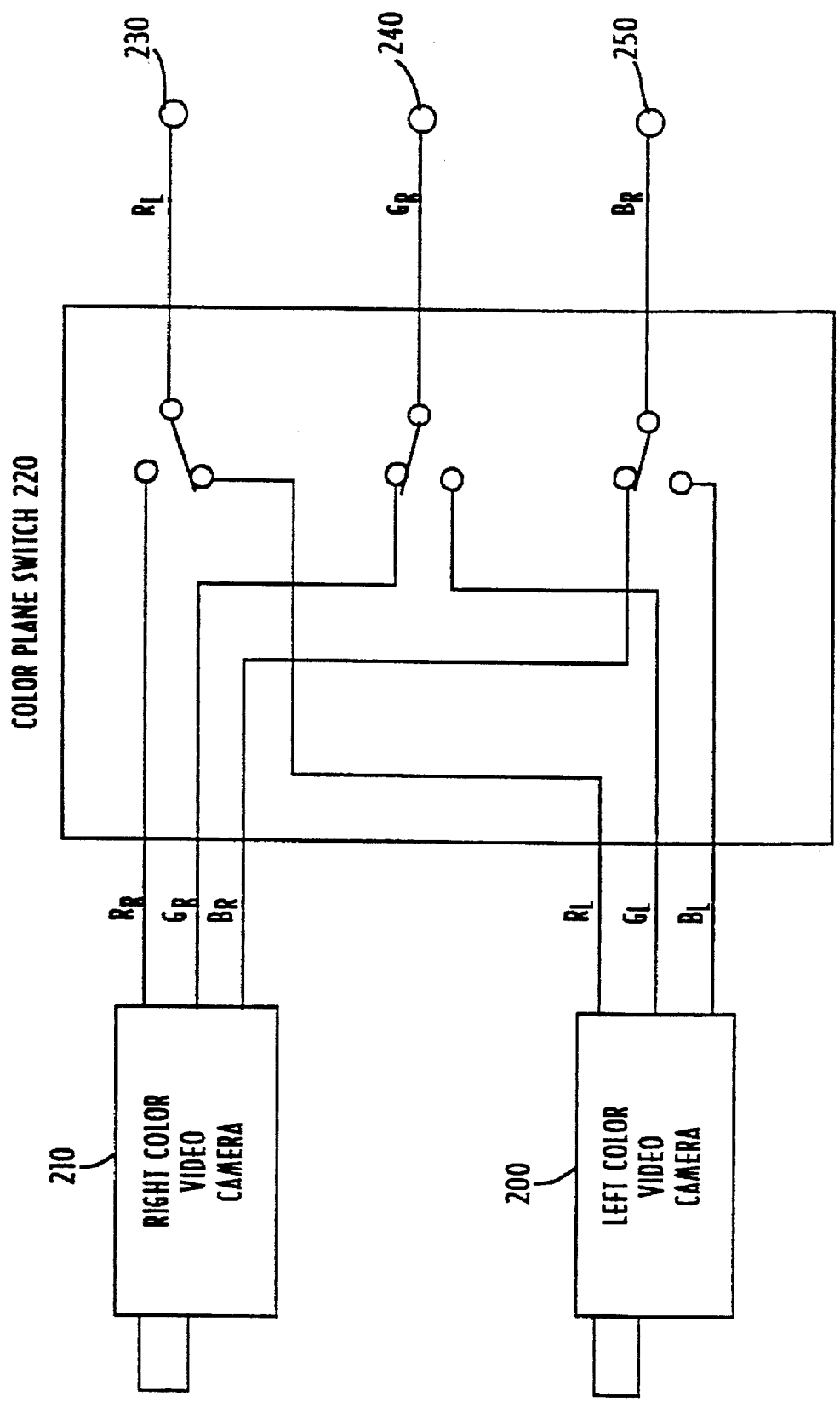
FIG. 4 is an illustration of how image planes from two video cameras can be combined to produce a color 3-D image.

FIG. 4 illustrates a particularly simple technique for generating 3-dimensional images in which the color information is retained. Left and right color video cameras 200 and 210 are positioned so as to capture two different views of the same scene. Preferably, the optical axis of the objective lenses of left and right video cameras 200 and 210 are separated by approximately the interocular distance. Each left and right color video cameras 200 and 210 have respective red, green and blue outputs which are labeled $R_L$, $G_L$ and $B_L$ and $R_R$, $G_R$ and $B_R$, respectively. The red, green and blue outputs from each of the two cameras is fed to color planes switch 220 where the red color plane from the left camera is substituted for the red color plane of the right camera to produce a composite output $R_L$, $G_R$ and $B_R$ at outputs 230, 240 and 250 respectively. If analog, these signals may be sampled directly and stored as separate color planes. If digital, they may be combined into the format shown in FIG. 1. Alternatively, analog output from 230, 240 and 250 may be used to produce a 3-dimensional color video image.

Figure 5:
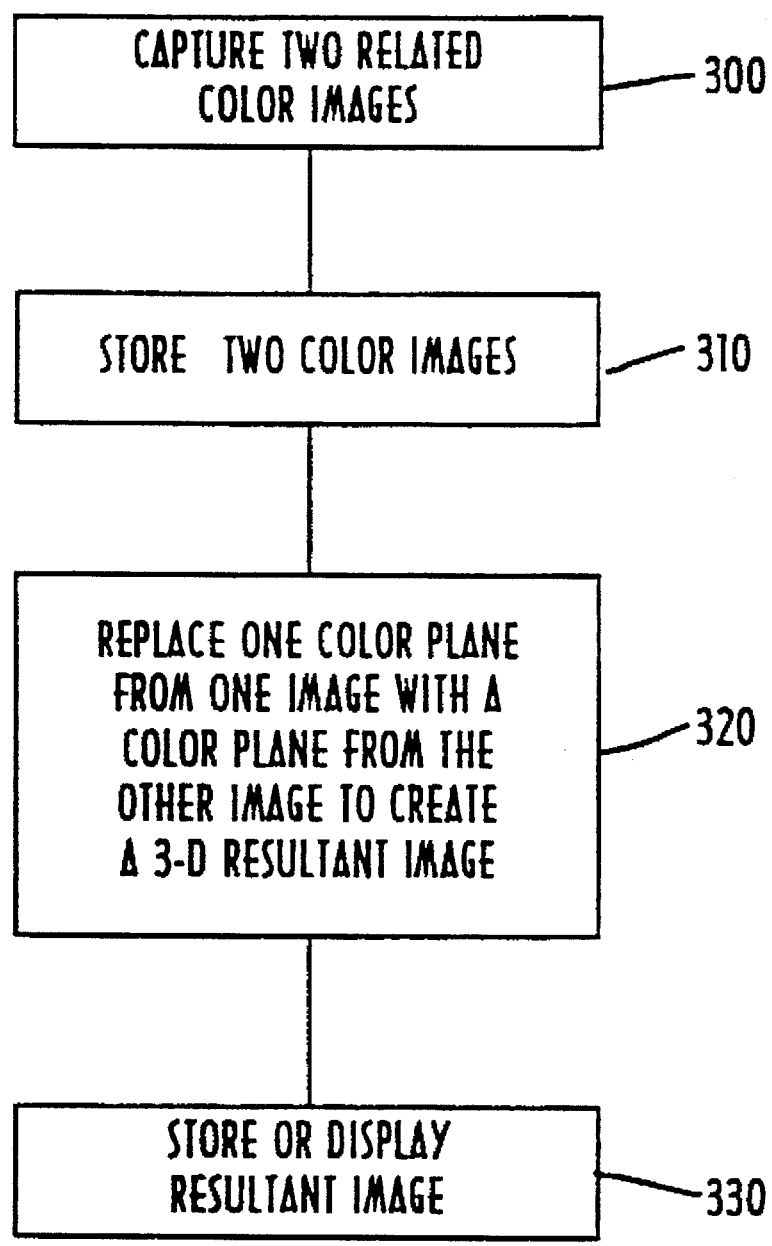
FIG. 5 is a flow chart of image processing required to produce a color 3-dimensional image from two 2-dimensional colored digital images.

FIG. 5 shows a flow chart of image processing required to produce a color 3-dimensional image from two color digital images. First two related color images are captured (300) and optionally stored as two color digital images (310). Then, one color plane from one image is replaced with the color plane from the other image to create a 3-dimensional result in image (320) which can be either stored in an image store or viewed on a display, respectively (330).

Figure 6:
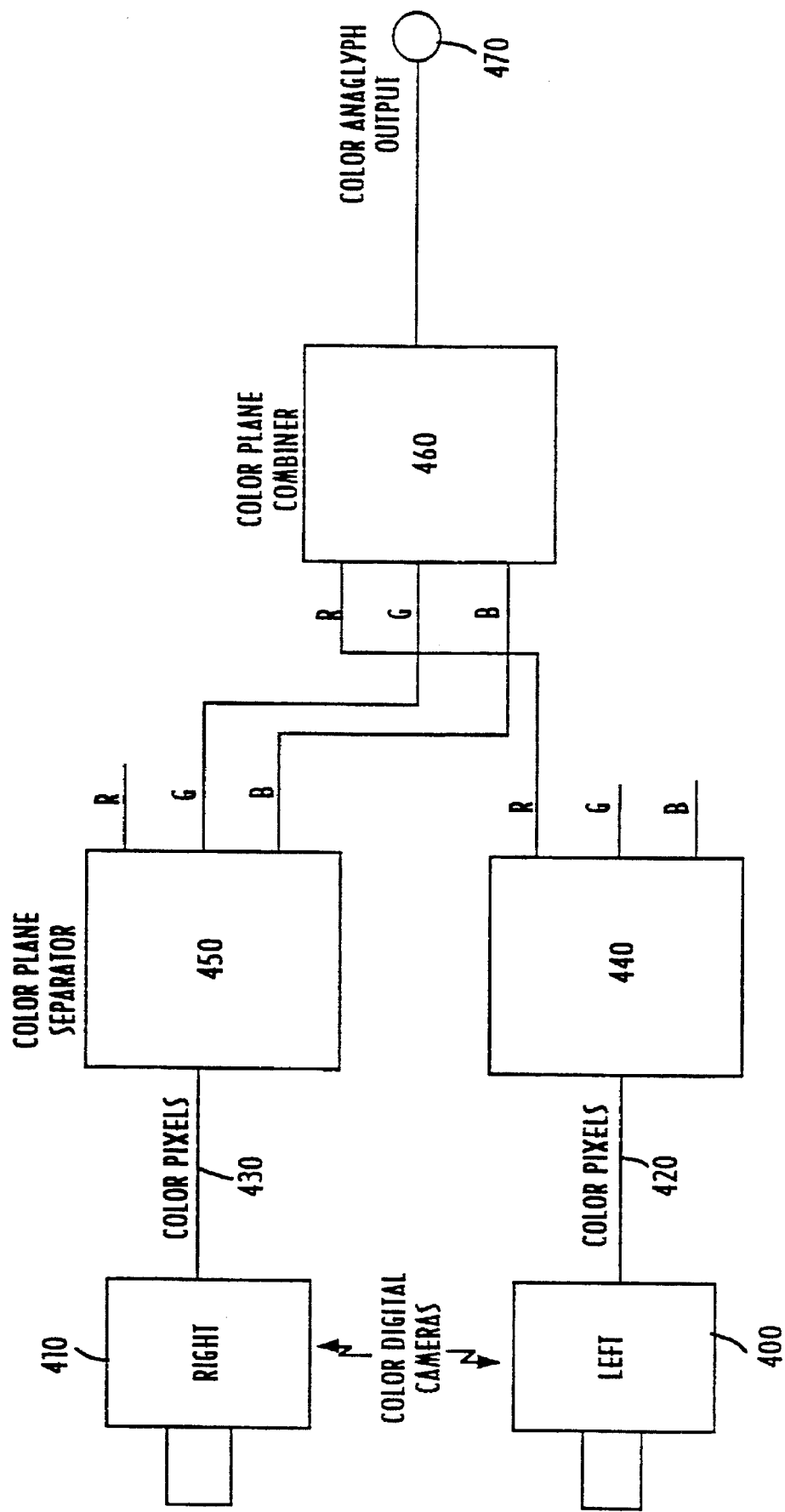
FIG. 6 is a drawing illustrating the creation of a 3-dimensional color still image.

FIG. 6 illustrates how a 3-dimensional color still pictures, or an anaglyphs, may be created. Color digital cameras 400 and 410 capture related still images of a scene to be photographed. Again, it is preferred that the optical axis of the objective lenses of the left and right digital cameras be separated by approximately the interocular distance. Color pixels in digital format are output from cameras 400 and 410 on lines 420 and 430, respectively and are fed to respective color plane separators 440 and 450 respectively. The output of the color plane separators are respectively combined in color plane combiner 460 such that the red image plane from the right camera is replaced with a red image plane from the left camera in color plane combiner 460. The result is an output, 470, which directly produces a color anaglyph of the image captured by the cameras in a particularly simple and efficient manner.

FIG. 6 also illustrates the computer generation of 3-dimensional anaglyphs. An object is represented in a 3-dimensional representation such as a wire frame generated using a 3-dimensional database. A full color surface can be rendered (applied) on the wire frame. Two different 2-dimensional computer generated views of the object are created from different perspectives, corresponding to views from the left and right cameras shown in FIG. 4. The red image plane from the left perspective is combined with the blue-green image planes from the right perspective to create a 3-dimensional anaglyph representation of the computer generated object.

Figure 7:
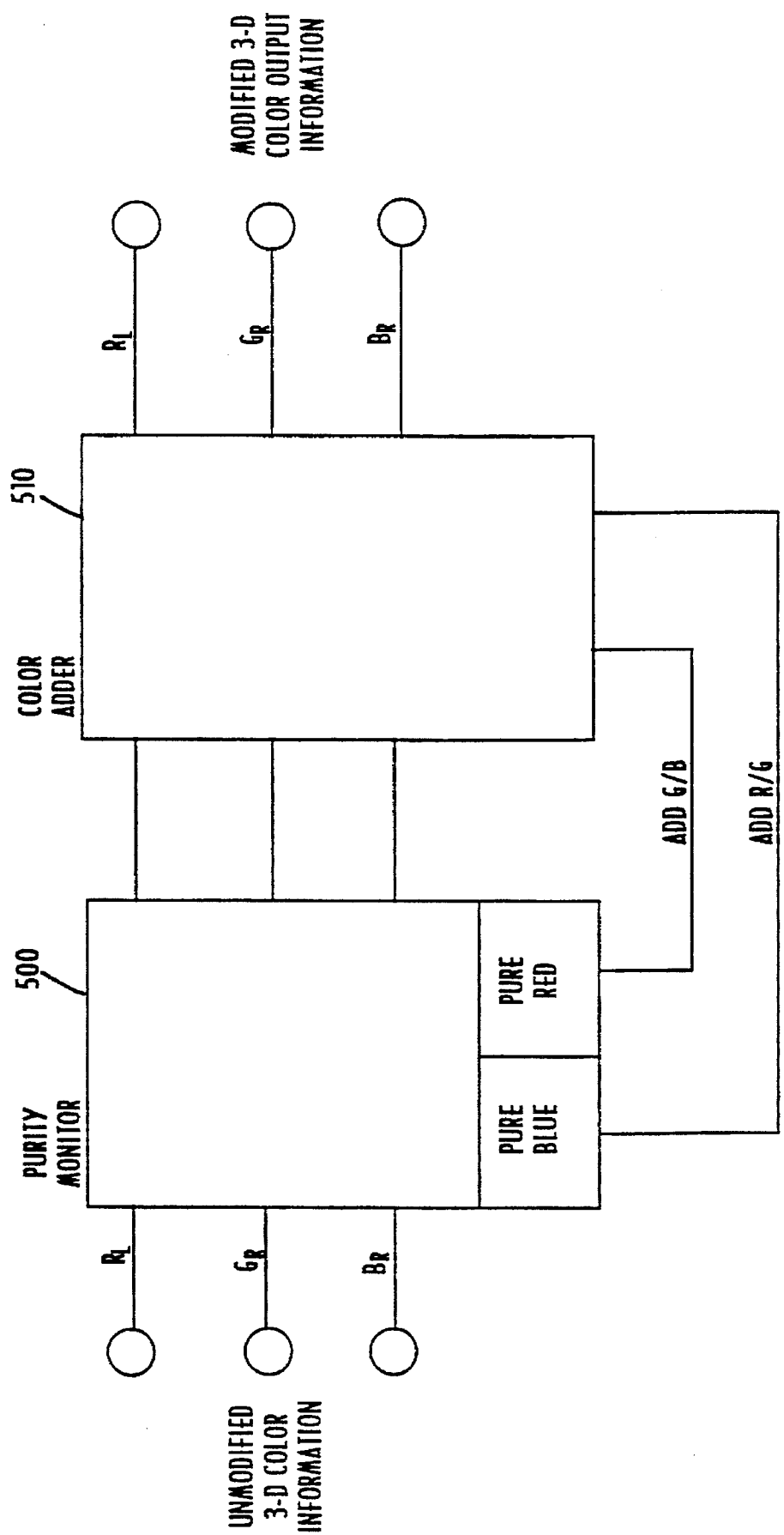
FIG. 7 is a functional illustration of how 3-dimensional color image data is processed to achieve a more pleasing color presentation.

FIG. 7 is an illustration of functionality utilized to eliminate the disturbing effects of viewing pure blue or pure red colors through red/blue viewers. The unmodified 3-D color information such as produced at the output of the FIG. 2 circuitry, is applied at the input purity monitor 500. Purity monitor 500 monitors color plane information and detects when a pixel is either pure blue or pure red within certain tolerances. If a pure red pixel is detected, a certain quantity of green/blue information is added by color adder 510. Similarly, if a pure blue pixel is detected, a certain amount of red/green information is added. The net result is to eliminate pure red or pure blue pixels and the psychological/physiological disturbances that come from viewing such pixels with red/blue viewers. The modified 3-D color output information from color adder 510 has somewhat more muted color information, but the overall subjective viewing quality is improved by the processing illustrated in FIG. 7.

Figure 8:
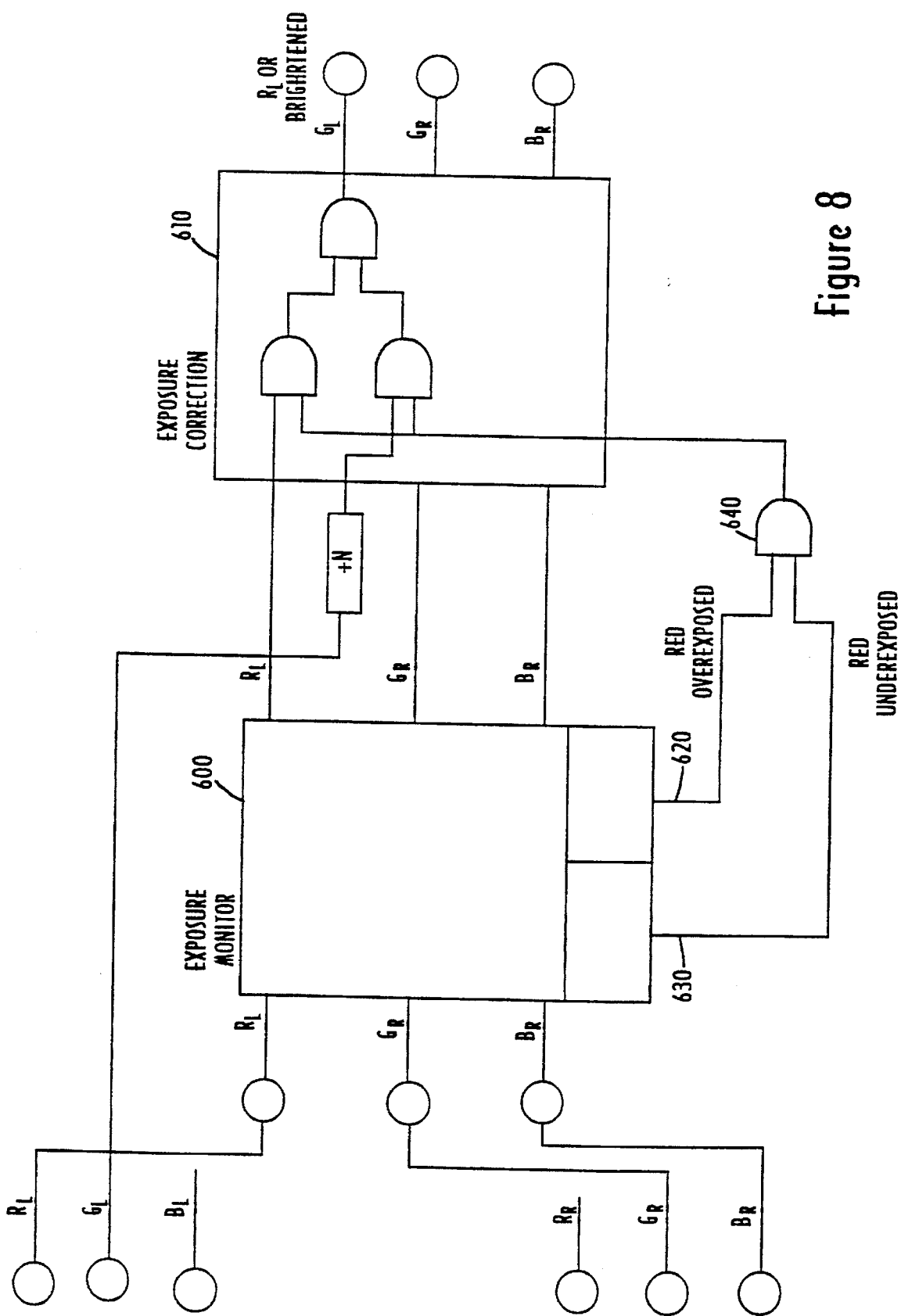
FIG. 8 is a functional depiction of how over- or under-exposure of an image plane can be corrected.

FIG. 8 is a functional illustration of correction of over-exposure or underexposure in a particular image plane. The inputs to exposure monitor 600 are unmodified 3-dimensional color information such as that generated by the circuitry of FIG. 4. Since red over-or-under-exposure has a significant impact on 3-dimensional image color quality, FIG. 8 illustrates monitoring of the red color plane for under or overexposure. Exposure monitor 600 detects over or underexposure by essentially creating a histogram of the red color values being received by the exposure monitor. If most color values are at the high end, red is likely over-exposed. If most values are at the low end, red is likely underexposed. When such a circumstance is detected, exposure correction circuit 610 responds by substituting a brightened version of the green image plane from the same camera from which the red image plane originated for the over or underexposed red image plane.

Exposure monitor 600 periodically samples the incoming values from the red image plane and counts the number of pixels at each level of intensity. At the end of the sampling duration, the number of samples at each of the upper and lower ends of the red color value are examined to determine whether an inordinate percentage of color values fall at those extremes. If the number of pixels at either extreme is inordinately high, then output signal 620 or 630 is generated as appropriate. These two output signals are OR'd in gate 640 and control an electronic switch which replaces the red image plane with a brightened version of the green image plane from the same camera which originated the red image plane. Such brightening occurs by incrementing the green intensity level by "N" steps.

Thus, intervals of under or over-exposure of the red image plane can be corrected to provide a pleasing color 3-dimensional image to the viewer.

Figure 9:
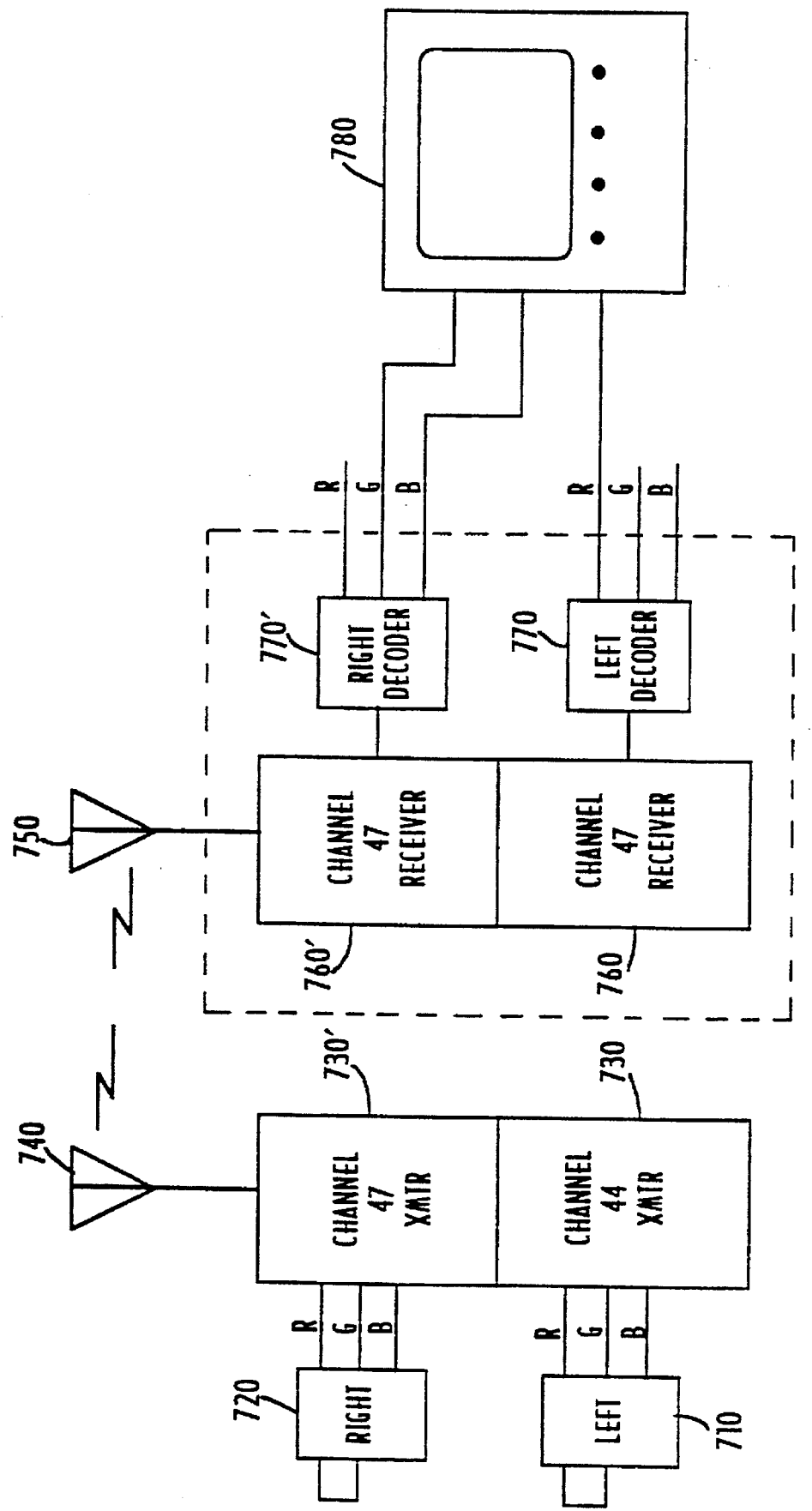
FIG. 9 is a block diagram of a system for transmitting and receiving 3-dimensional television images.

FIG. 9 illustrates a technique for transmitting 3-dimensional images to a viewer utilizing standard television broadcasting equipment. The color video cameras 710 and 720 capture the left and right views respectively of a scene to be transmitted. The RGB output from camera 710 and 720 are fed to respective color television transmitters 730 and 730' which transmit on separate television broadcast channels. Although a single antenna 740 is shown for these transmitters, each transmitter may have its own separate antenna and, in fact, each transmitter may be located at a separate physical location. Images from the two transmitters are received at antenna 750 and fed to receivers 760 and 760' where the RF information is converted to color video baseband in decoder 770 and 770' and synchronized RGB outputs are provided by the decoders. Receivers 760 and 760' may have individual antennas instead of a common antenna 750 as shown. The RGB outputs of the decoder 770 and 770' are connected as shown so that the red image plane is taken from the left decoder and the green and blue image planes are taken from the right decoder and the RGB information is applied to a display such as television set 780. Alternatively, the full left and right images could be applied to left and right displays of a virtual reality viewer, where the left eye would see the full left image and the right eye, the full right image.

Thus, using two channels of normal broadcast television equipment one can create 3-dimensional color television at a user location.

Figure 10:
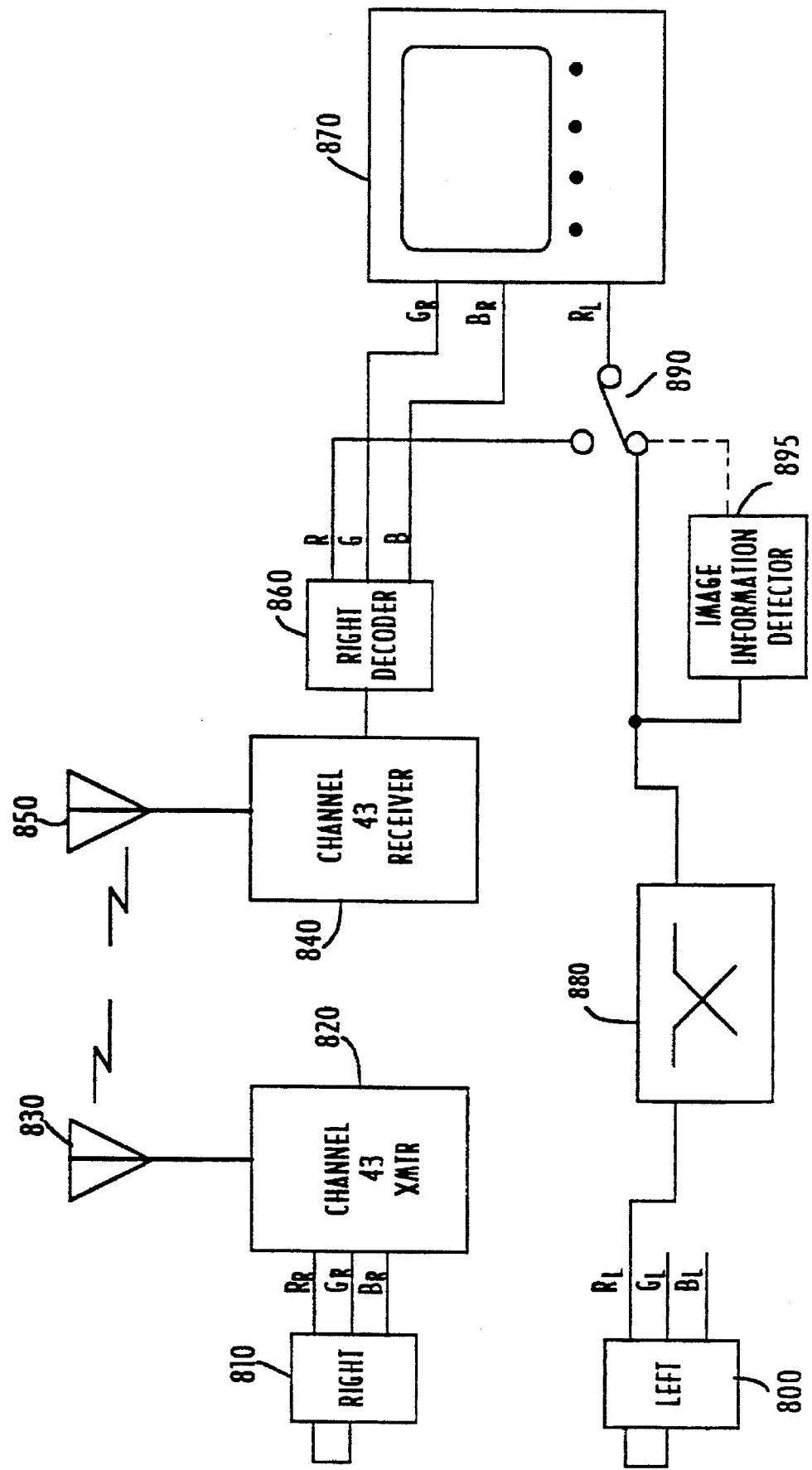
FIG. 10 is a block diagram of another system for transmitting and receiving 3-dimensional television images.

FIG. 10 is an illustration of another method of providing 3-dimensional color television images to a user. One color camera 810 captures a scene normally and its color output is broadcast over color television transmitter 820 and antenna 830 to a receiving antenna 850 and a receiver 840 tuned to the channel. Right decoder 860 produces RGB output from the signal received by the receiver and the green and blue image planes are connected to the display of television set 870. The red image plane from left camera 800 is transmitted over a point to point communication link represented by network 880 to the viewer's location where it may be combined with synchronized green and blue image planes from the right decoder 860 to produce a 3-dimensional image on the display of television receiver 870. A simple switch 890 allows a user to switch between normal color television reception and 3-dimensional color television reception. In normal mode all three image planes from right decoder 860 are fed to color television display 870. In 3-dimensional color television mode, a user might dial up the video information provider over network 880 and request 3-dimensional service. The video information provider would then allow, after suitable arrangements for compensation have been made, the user to download the red image plane of the left camera 800 to complete the 3-dimensional image. The presence of 3-dimensional image data on the point to point communications link can be detected automatically and utilized to control switch 890 so that 3-dimensional information is displayed when 3-dimensional information is available and otherwise 2-dimensional information is displayed.

Figure 11A:
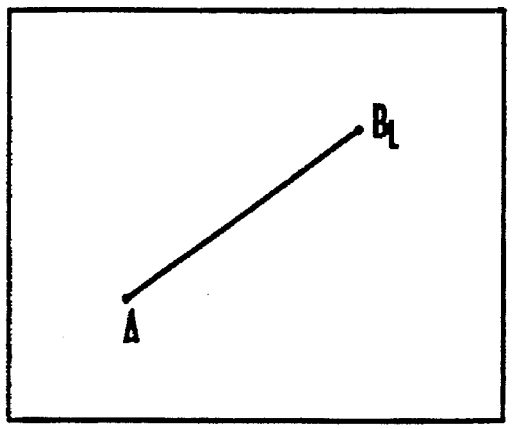
FIGS. 11(a)–11(c) illustrate the process utilized to achieve an epipolar condition between left and right images of a stereo pair.
Figure 11B:
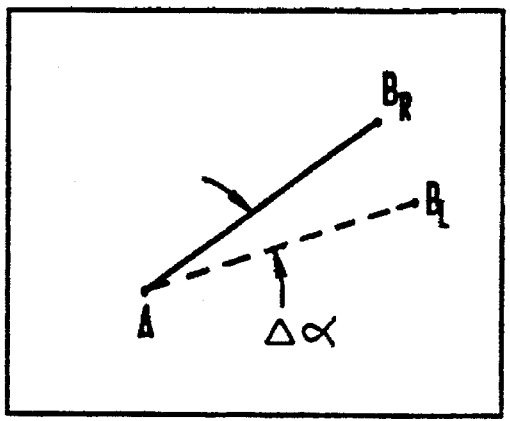

FIGS. 11a and 11b show the left and right images of a stereo image pair, respectively. The left image preferably consists of only the red color plane from the left image and right image preferably consists of only the green and blue color planes from the right image as discussed before. To make the left and right images epipolar, one identifies a point A which lies in the neutral plane. Since it lies in the neutral plane, there is no disparity shift between point A on the left image and point A on the right image. Point B, consisting of image point BL and BR from the left and right images, respectively, does not lie in the neutral plane and therefore the location of point B on the left image ($B_L$) is different from the location of point B on the right image ($B_R$). Since it is desirable that the image of point B on the right image have the same vertical displacement from the top of the image plane as point B on the left image to reduce user discomfort such as eye strain and headaches, it is necessary to calculate an amount of rotation required so that this can occur.

Figure 11C:
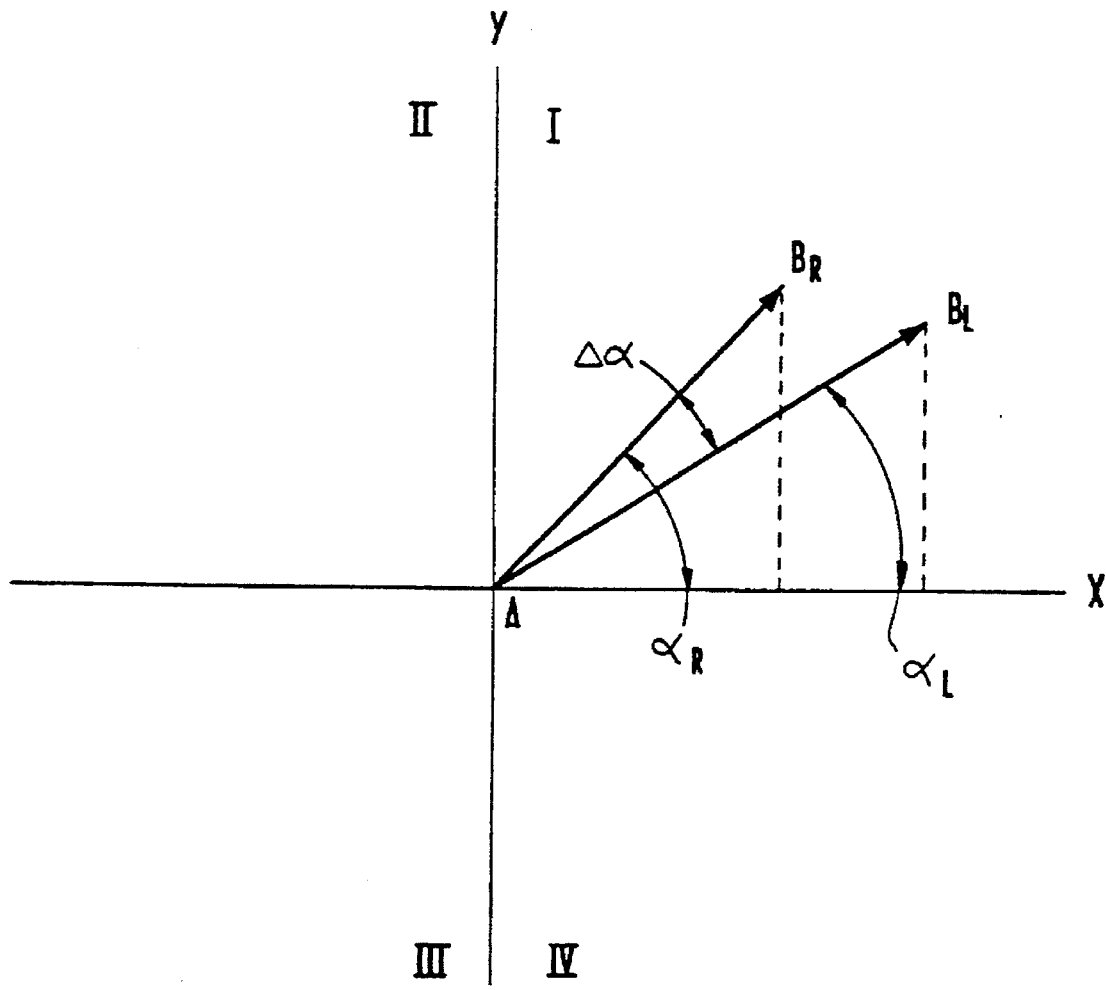

FIG. 11C illustrates this. As indicated, point A lies in the neutral plane and therefore there is no disparity with respect to the left and right images as to point A. If point A is treated as the origin of a coordinate system with axes running parallel to the axes of the image plane, then the amount of rotation required to the left image plane to produce the same vertical displacement as seen by point B in the right image plane about neutral point A is the amount $\Delta\alpha$. The angles $\alpha_R$ and $\alpha_L$ and $\Delta\alpha$ are calculated as shown in FIG. 11C.

A certain ambiguity arises when the vector $AB_L$ resides in a different quadrant from vector $AB_R$. Quadrants are labeled in FIG. 11C with Roman numerals. The signs of coordinates for points $B_L$ and $B_R$ determine the quadrant in which the vector $AB_R$ and $AB_L$ fall. In accordance with the following table:

| QUADRANT | Y | X |
|---|---|---|
| I | + | + |
| II | + | − |
| III | − | − |
| IV | − | + |

Vecetors $AB_R$ and $AB_L$ lie in different quadrants, then there are two rotations which will result in the same vertical height, namely the Y component of points $B_R$ and $B_L$. One of those rotations is clockwise and one is counter clockwise. By examining the signs of the coordinates of points $B_R$ and $B_L$, a simple decision can be made, for example, using a look-up table, to determine the direction of rotation required to place both vectors in the same quadrant.

Figure 12:
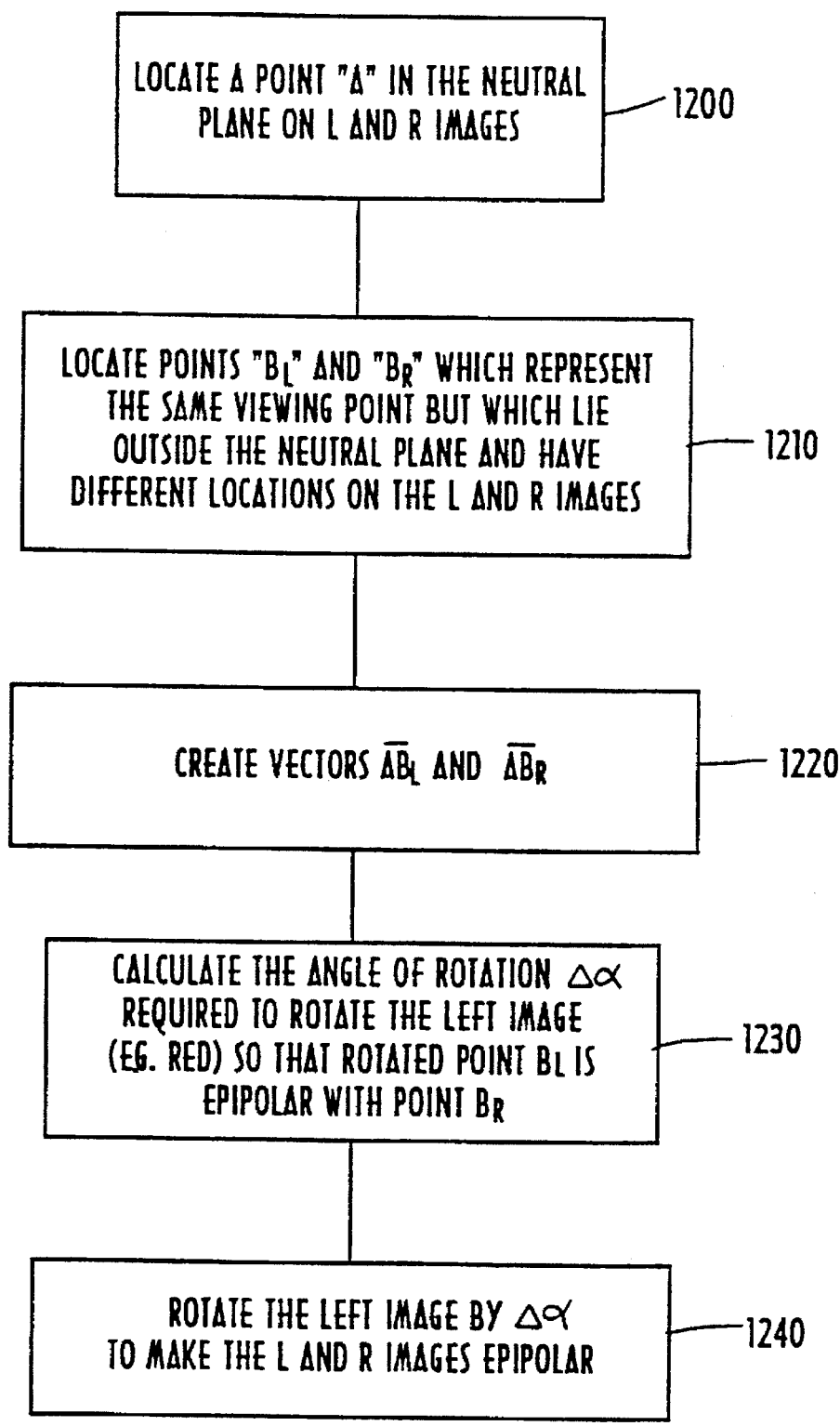
FIG. 12 is a flow chart for an algorithm for determining the amount of rotation required to achieve an epipolar condition.

FIG. 12 is a flow chart of the process of making the left and right images of a stereo pair equipolar. Step 1200 of point A is located in the neutral plane on the left and right images. At step 1210, one locates points "$B_L$" and "$B_R$" which represent the same viewing point but which lie outside the neutral plane and therefore have different locations in the left and right images. At step 1220, vectors $AB_L$ and $AB_R$ are created. At step 1230, the angle of rotation $\Delta\alpha$ is calculated as set forth in FIG. 11C and at 1240 the left image, preferably, is rotated by $\Delta\alpha$ to make the left and right images equipolar.

Figure 13:
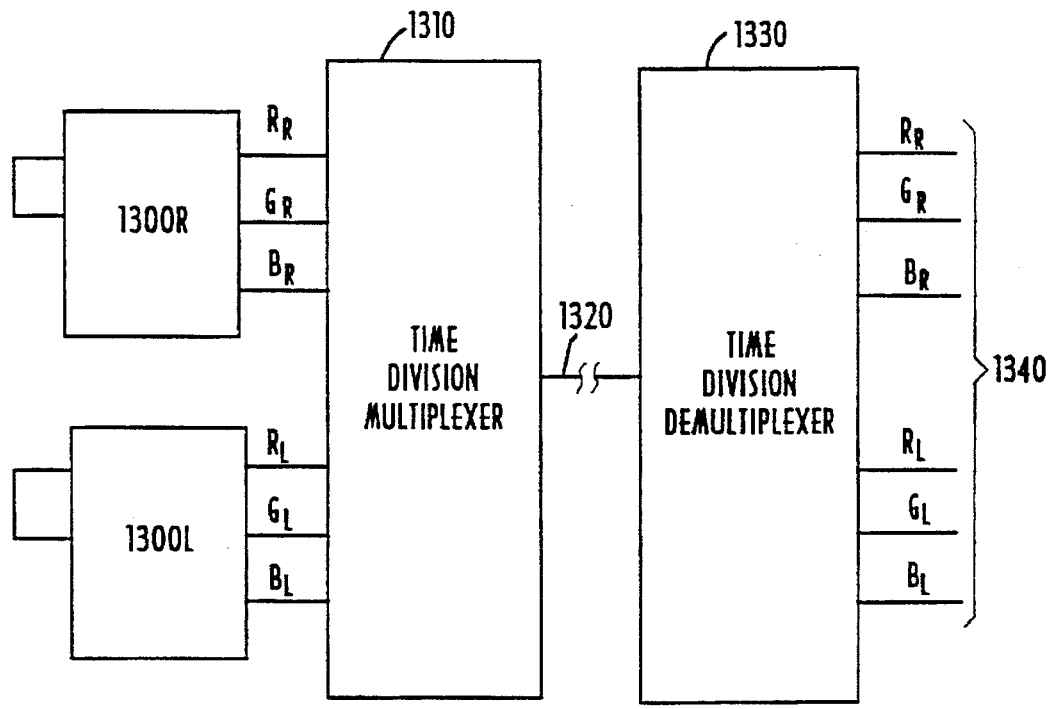
FIG. 13 illustrates time division color plane multiplexing using six color planes.

FIG. 13 illustrates a transmission technique for transmitting color plane information utilizing time division multiplexing. Left and right cameras 1300L and 1300R produce respective color plane outputs RGB which are fed to time division multiplexer 1310 where they are multiplexed and transmitted over a transmission length 1320 to time division demultiplexer 1330 where the color planes are again separated out. This particular arrangement is particularly advantageous because it allows one to achieve either full stereo three dimensional images, field sequential stereo images or color plane shift stereo images ($R_L$ $G_R$ $B_R$) at the output.

Figure 14:
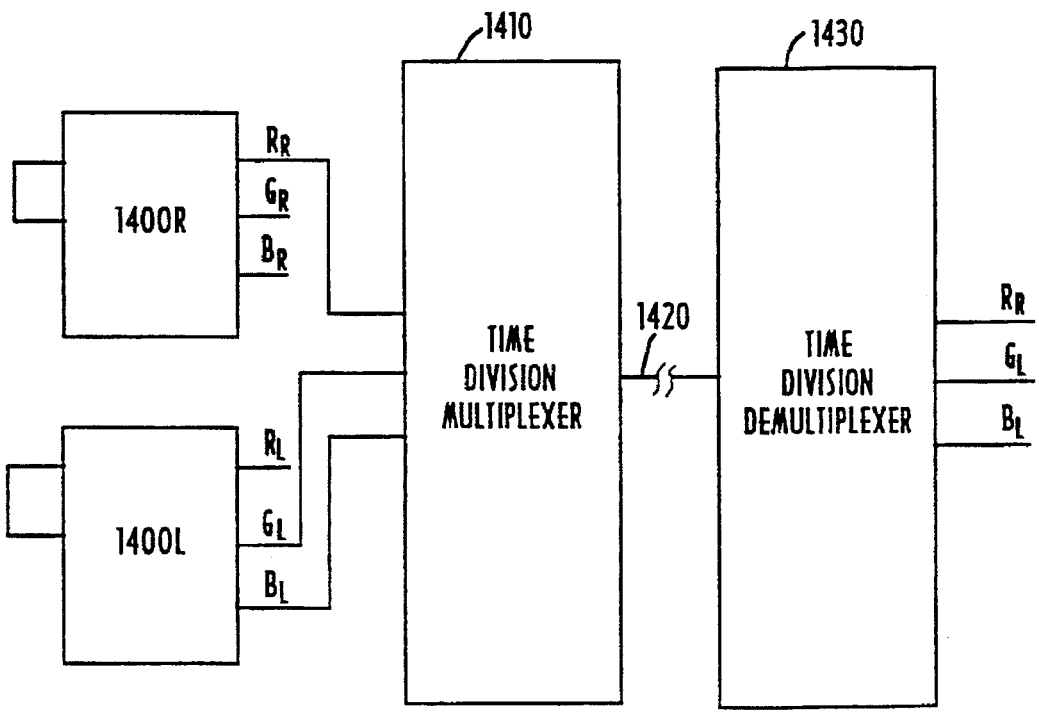
FIG. 14 illustrates time division color plane multiplexing using three color planes.

An alternative arrangement is shown in FIG. 14 where the color plane shift technique is applied prior to multiplexing so that only three channels are transmitted across the time division multiplex communication link 1420.

Figure 15:
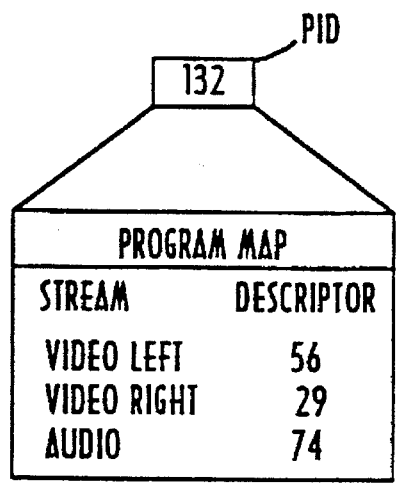
FIG. 15 illustrates the use of MPEG-2 to multiplex left and right video programs.

FIG. 15 illustrates one method of arranging a program map to accommodate stereo transmission using an MPEG-2 transmission link. In the program map shown as an expansion of PID 132 in FIG. 15, separate video streams for left and right video images are defined with their corresponding PID's. Thus, as shown, a full color video left channel is assigned to PID 56 and a full color video right channel is assigned to PID 29 with the audio channel for the stereo representation assigned PID 74. Referring the transport stream of FIG. 1, these PID's will be found in the transport stream as required to satisfy the band width requirements for the transmission. At the decoder, such as shown in FIG. 17 and discussed more in detail hereinafter, PID's are assigned to the appropriate video decoder or audio decoder for decoding and connection to the display devices.

Figure 16:
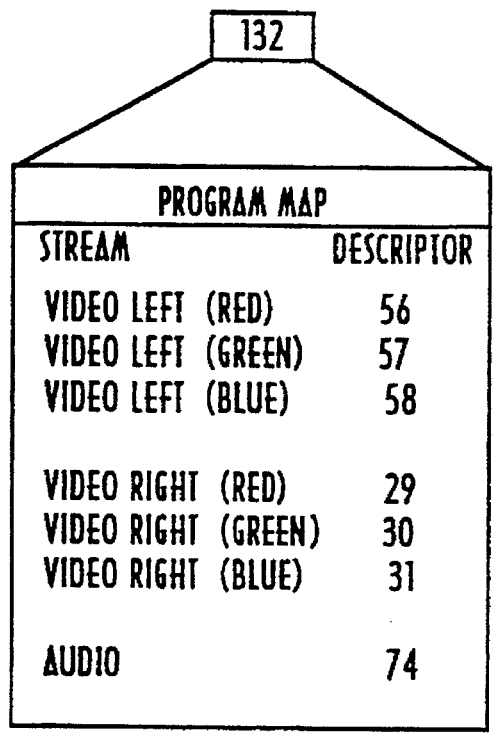
FIG. 16 illustrates the use of MPEG-2 for providing six separate color plane programs.

FIG. 16 shows an alternative method of assigning streams to the program map of PID 132. In this arrangement, PID's 56, 57 and 58 are assigned to respective red, green and blue color planes of the left video source and PID's 29, 30 and 31 are assigned to the respective red, green and blue color planes of a right video source. As before, audio channel is assigned PID 74.

Figure 2:
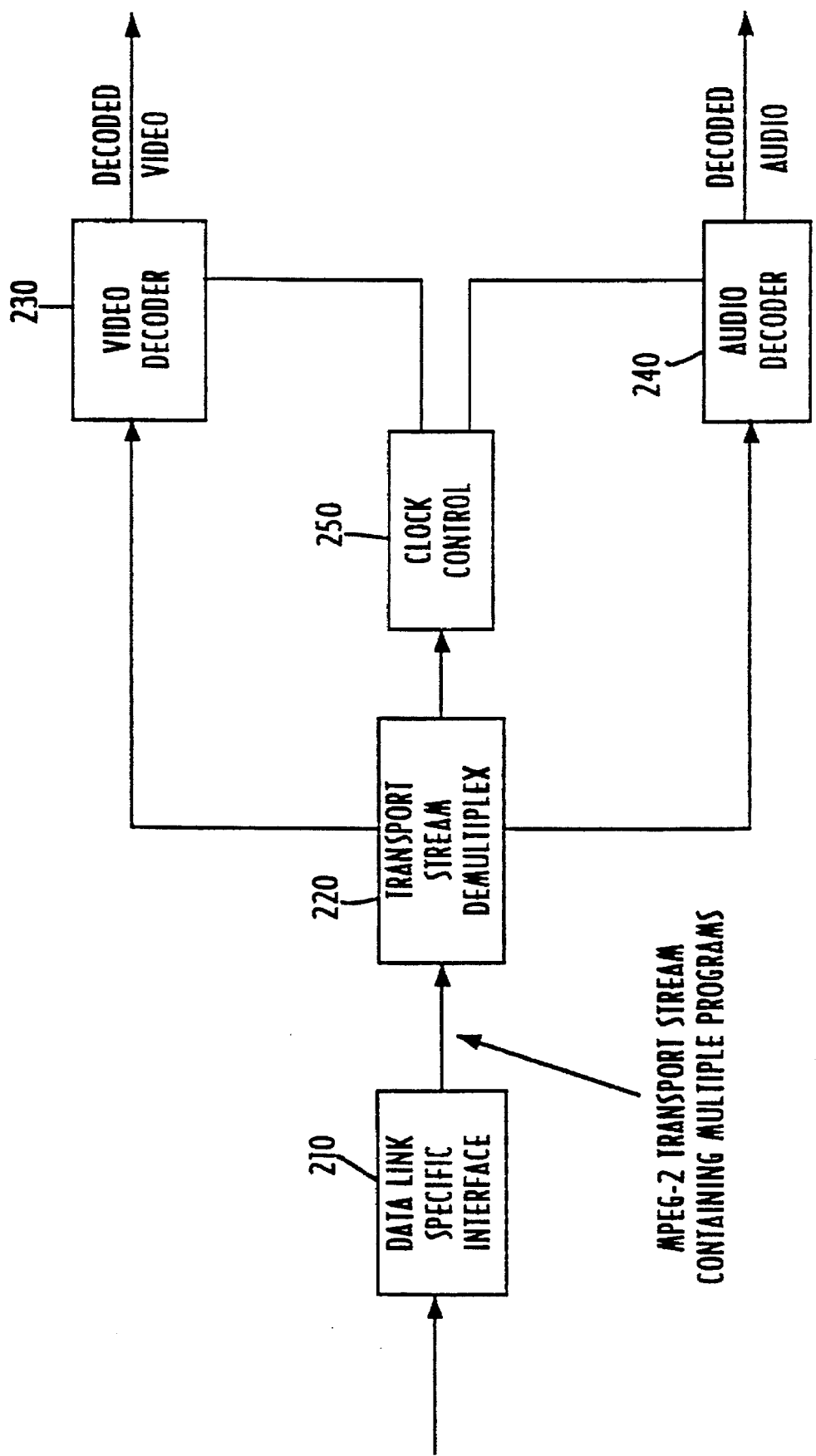
FIG. 2 depicts a generic MPEG-2 decoder.
Figure 17:
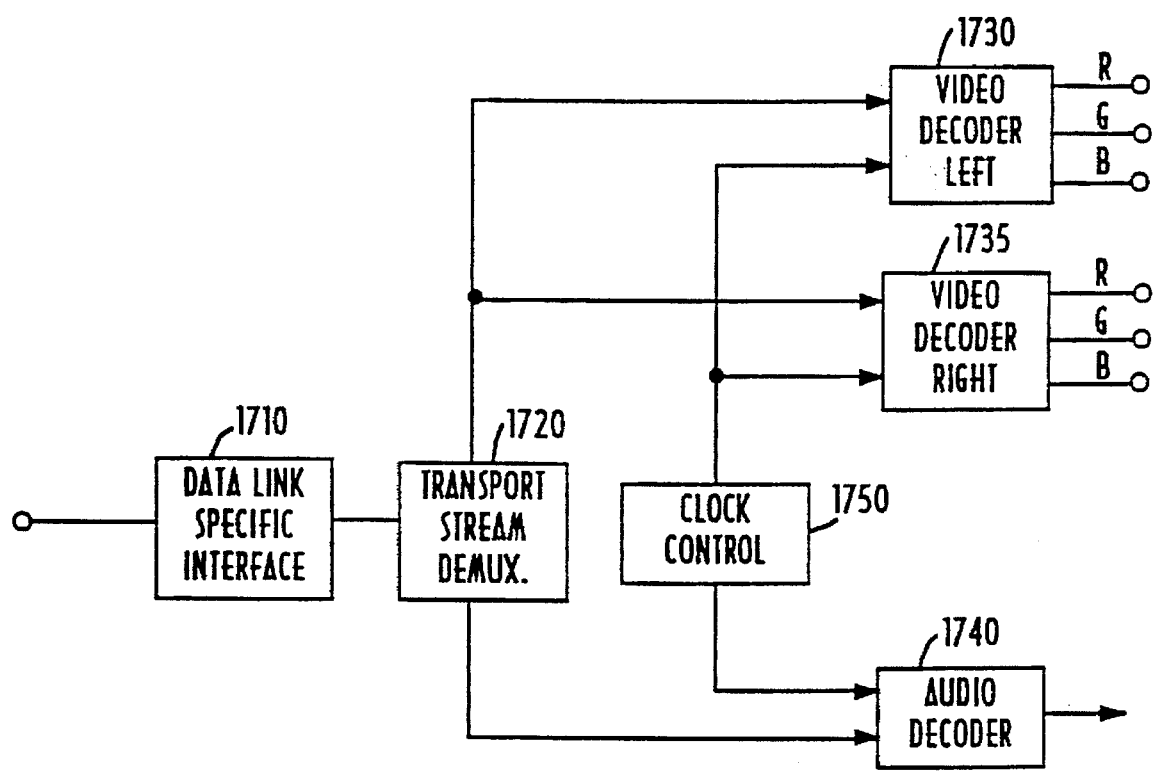
FIG. 17 illustrates an MPEG-2 decoder suitable for use with the invention.

FIG. 17 shows modifications of the generic MPEG-2 decoder illustrated in FIG. 2. If separate PID's are assigned to left and right video information as illustrated in FIG. 15, then video data packets will be routed from transport stream demultiplexer 1720 to respective video decoders 1730 and 1735 where video information from the appropriate PID will be processed. The output from video decoders 1730 and 1735 is shown in red green blue color plane form although a composite video signal could be used as an alterative. The use of separate color plane outputs is desirable because they permit the use of full stereo imaging as might be utilized with a "virtual reality" helmet having separate displays for each eye, or for field sequential display using a single display synchronized with, for example, liquid crystal glasses so that left images are visible in the left eye only when a left image is displayed and only in the right eye when a right image is displayed, or for switching color planes to form a color plane shifted stereo image.

If separate color planes are assigned separate PID's as illustrated in FIG. 16, then video decoder 1730 and 1735 would be modified to permit assignment of three PID's to each decoder with three output buffers to which packets arriving with particular PID's can be sent selectively so that red, green and blue output data appears at each of the outputs.

In certain software packages, three dimensional perspective views are generated from three dimensional wireframes. In the course of generating the perspective view, information is needed about the object location and the camera location and orientation vis-a-vis the object, referenced against some type of coordinate system. The identity of the object specifies essentially the work file containing the wireframe and other information. With such information available, it is possible to convert a three dimensional perspective view into a three dimensional stereo view. This is done by placing a second camera at a location offset from the camera location from which the perspective view is generated. A second camera position is then utilized to generate a second view of the object from the wireframe information. Once the wireframe generated by a second view of the object is generated, the original perspective view and the rendered second view of the object can be utilized to produce a three dimensional stereo view of the object in the way indicated above.

Alternatively, a camera location from which the perspective view was generated can be utilized as a center point and two cameras can be set symmetrically about that center point, each camera would then generate a view of the object from their respective positions. Once the respective views were rendered with surface information, they constitute a stereo image pair to which the techniques described in this application can be applied. Preferably, the two cameras positioned symmetrically about the camera location from which the perspective view is generated will have fixed parallel optical axes and fixed orientations.

Some software packages specify the location of a targeted object with respect to the same coordinate system. It is desirable to adjust the disparity so that the targeted object lies in the neutral plane. Preferably, this is a default setting which can be overridden by adjusting disparity in ways indicated herein.

Accordingly, there have been described methods and apparatus for the creation and transmission of 3-dimensional color images which overcome the problems of the prior art. In this disclosure, there has been shown and described only the preferred embodiment of the invention, but, as aforementioned, it is to be understood that the invention is capable of use in various other combinations and environments. It is capable of changes or modifications within the scope of the inventive concept as expressed herein.

What is claimed is:

1. A method of improving the viewability of three dimensional stereo images of a scene consisting of a left image and a right image which when viewed together give a perception of a stereo view of the scene, comprising:

identifying a point lying in a neutral plane as a reference point, selecting a point not located in the neutral plane, and rotating one of said left image or right image by an amount required to cause the locations of the left and right images of said point not located in the neutral plane to have substantially identical vertical displacement in the viewing plane.

* * * * *